United States Patent
Kawamori et al.

(10) Patent No.: US 10,654,060 B2
(45) Date of Patent: May 19, 2020

(54) NOZZLE INSPECTION APPARATUS AND NOZZLE INSPECTION METHOD

(71) Applicant: SUGINO MACHINE LIMITED, Uozu, Toyama Prefecture (JP)

(72) Inventors: Yoshiteru Kawamori, Uozu (JP); Toyoaki Mitsue, Uozu (JP); Tomio Sawasaki, Uozu (JP)

(73) Assignee: SUGINO MACHINE LIMITED, Uozu, Toyama Prefecture (JP)

( * ) Notice: Subject to any disclaimer, the term of this patent is extended or adjusted under 35 U.S.C. 154(b) by 85 days.

(21) Appl. No.: 16/191,928

(22) Filed: Nov. 15, 2018

(65) Prior Publication Data

US 2019/0275542 A1    Sep. 12, 2019

(30) Foreign Application Priority Data

Mar. 7, 2018    (JP) ................................ 2018-040402

(51) Int. Cl.
| | |
|---|---|
| *G01L 5/00* | (2006.01) |
| *B05B 12/00* | (2018.01) |
| *G01L 1/00* | (2006.01) |
| *B05B 12/18* | (2018.01) |
| *B05B 12/08* | (2006.01) |

(52) U.S. Cl.
CPC ............ *B05B 12/006* (2013.01); *G01L 1/00* (2013.01); *G01L 5/0052* (2013.01); *B05B 12/082* (2013.01); *B05B 12/18* (2018.02)

(58) Field of Classification Search
CPC ..... B05B 12/006; B05B 12/18; B05B 12/082; G01L 1/00; G01L 5/0052

USPC .......................................................... 73/807
See application file for complete search history.

(56) References Cited

U.S. PATENT DOCUMENTS

| | | | |
|---|---|---|---|
| 10,215,769 B1 * | 2/2019 | Huettel ............ | G01N 35/00693 |
| 2005/0145358 A1 * | 7/2005 | Ischdonat ................. | D21F 1/32 |
| | | | 162/199 |
| 2006/0151628 A1 * | 7/2006 | Fekete ................. | F02M 65/005 |
| | | | 239/102.2 |
| 2014/0034747 A1 * | 2/2014 | Wiehoff .............. | F02D 41/2096 |
| | | | 239/5 |
| 2019/0187173 A1 * | 6/2019 | Haremaki ................. | B08B 3/04 |

FOREIGN PATENT DOCUMENTS

| | | |
|---|---|---|
| JP | H2-019545 A | 1/1990 |
| JP | 2866805 B2 | 3/1999 |
| JP | 2010-533265 A | 10/2010 |

(Continued)

OTHER PUBLICATIONS

Office Action dated Jan. 22, 2019 mailed in corresponding Japanese patent application No. 2018-040402, pp. 3.

*Primary Examiner* — Max H Noori
(74) *Attorney, Agent, or Firm* — United IP Counselors, LLC

(57) ABSTRACT

To improve the measurement accuracy of the state of the jet. The nozzle inspection apparatus includes a pump, a nozzle, a body having a cylinder, a pressure receiving plate receiving the jet generated by the nozzle, a piston load meter fixed to the pressure receiving plate and including a stem reciprocating in the cylinder, and a load meter measuring the load on the pressure receiving plate, and a moving mechanism moving the nozzle and the pressure receiving plate relative to each other.

20 Claims, 5 Drawing Sheets

(56) References Cited

FOREIGN PATENT DOCUMENTS

| | | |
|---|---|---|
| JP | 5432943 B2 | 3/2014 |
| JP | 2016-142216 A | 8/2016 |
| JP | 6147623 B2 | 6/2017 |
| JP | 6196588 B2 | 9/2017 |

* cited by examiner

NOZZLE INSPECTION APPARATUS AND NOZZLE INSPECTION METHOD

CROSS-REFERENCE TO RELATED APPLICATIONS

This application claims the benefit of priority to Japanese Patent Application No. 2018-040402, filed on Mar. 7, 2018, the entire contents of which are hereby incorporated by reference.

BACKGROUND

1. Technical Field

The present invention relates to a nozzle inspection apparatus and a nozzle inspection method.

2. Description of the Background

A conventional physical property measuring apparatus includes a rotation shaft, a water receiving portion protruded orthogonally to the rotation shaft, and a potentiometer provided on the rotation shaft. A conventional method includes measuring characteristics such as strength, width and center position of a water jet on the basis of an output of the potentiometer and a position signal of the water jet by passing the water jet while jetting the water jet to the water receiving portion (Japanese Patent No. 2866805, hereinafter referred to as "Patent Literature 1").

BRIEF SUMMARY

In the measurement method of Patent literature 1, since the water receiving portion is a needle-shaped projection, the characteristic distribution of the jet in the direction of the water receiving portion becomes an integral value of the rotational moment of the collision state of the jet from the rotation shaft, and cannot be accurately grasped. In order to determine the center position, it is necessary to combine in the X-Y direction.

The present invention aims to improve the measurement accuracy of the state of the jet.

A first aspect of the present invention relates is a nozzle inspection apparatus, including:
  a pump;
  a nozzle having a spout;
  a piston load meter including,
  a body having a cylinder,
  a pressure receiving plate configured to receive a jet generated by the nozzle,
  a stem fixed to the pressure receiving plate, the stem configured to reciprocate within the cylinder, and
  a load meter configured to measure a load applied to the pressure receiving plate, the load meter being in contact with a distal end of the stem; and
  a moving mechanism configured to move the nozzle relative to the pressure receiving plate.

A second aspect of the present invention is a nozzle inspection method, including:
  scanning, by a nozzle, inside a scan range on a plane parallel to a pressure receiving surface of a pressure receiving plate;
  measuring, by the pressure receiving surface, a load value by a jet generated by the nozzle;
  acquiring a coordinate of the nozzle with respect to a center of the pressure receiving surface;
  calculating an approximation function for approximating the load value to a reference function with respect to a coordinate value of the nozzle; and
  extracting a feature value from the approximation function, the feature value indicating a characteristic of the jet.

The present invention improves the measurement accuracy of the state of the jet.

DETAILED DESCRIPTION

Figure 1:
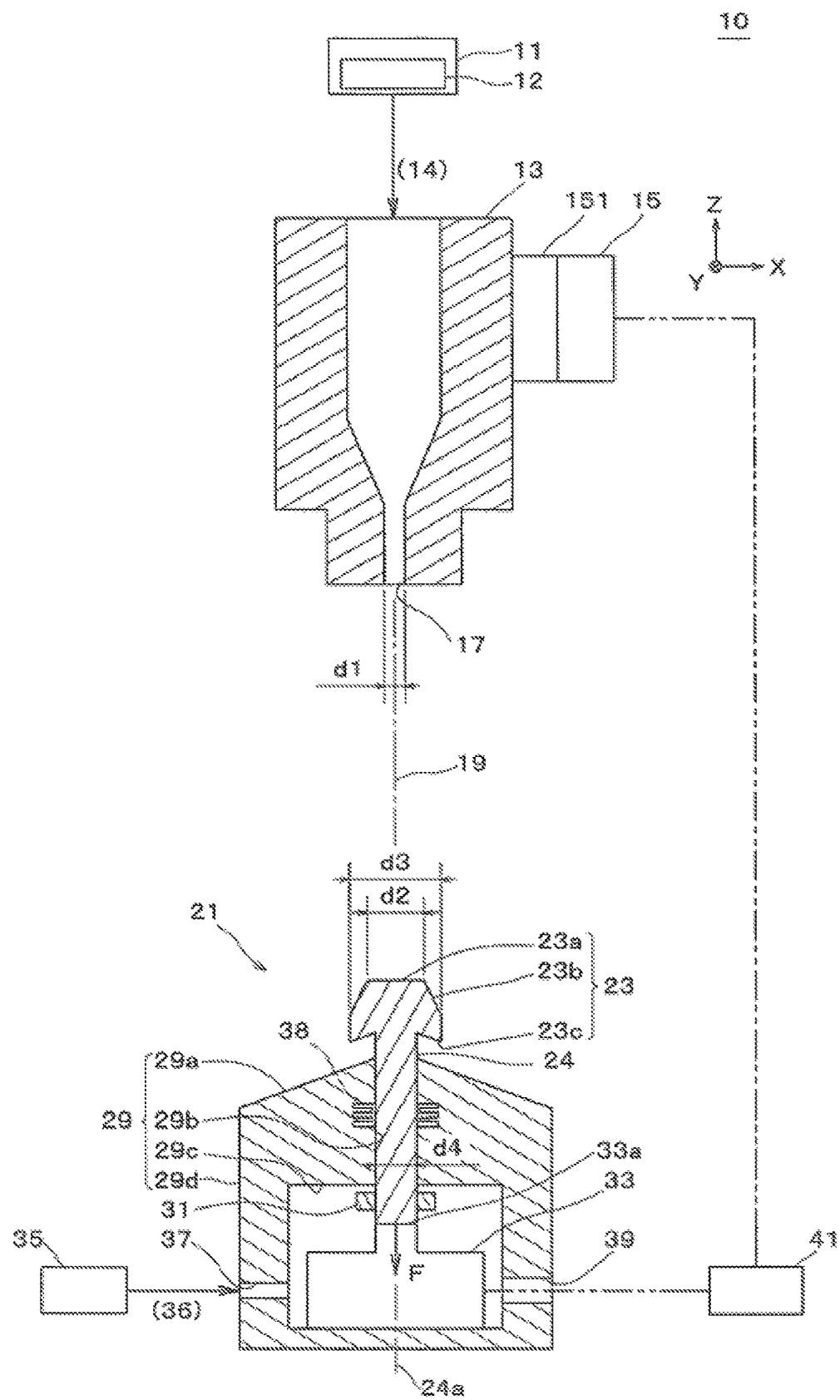
FIG. 1 shows a nozzle inspection apparatus according to an embodiment.

With reference to the drawings, an embodiment is described in details. As shown in FIG. 1, the inspection apparatus 10 of the present embodiment includes a pump 11, a nozzle 13, a moving mechanism 15, a piston load meter 21, and a control device 41. The inspection apparatus 10 may include a compressed air supply device 35 and a supply channel 37. The inspection apparatus 10 is suitably applicable to a washing machine such as a high-pressure washing machine or a high-pressure deburring device. The washing machine is described, for example, in Japanese Patent Nos. 5432943, 6147623 and 6196588.

The pump 11, which is a liquid pump, is connected to the nozzle 13. The pump 11 is, for example, a piston pump, a gear pump, or a centrifugal pump. The pump 11 is controlled by a control device 41. Preferably, the pump 11 has a valve 12. When the valve 12 is opened, the pump 11 supplies liquid 14 to the nozzle 13. The liquid 14 is an aqueous washing solution.

The pump 11 may further include a rotational speed control device (not shown) and a pressure control device (not shown). A rotational speed control device is described, for example, in Japanese Unexamined Patent Application Publication No. 2016-142216. When the pump 11 includes the rotational speed control or the pressure control, the pump 11 controls the pressure.

The nozzle 13 has a spout 17. The nozzle 13 is, for example, a direct injection nozzle for injecting a straight-shaped jet 20, a flat spray nozzle for injecting a flat fan-shaped jet 20, or a conical nozzle for injecting a conical jet 20. Hereafter, the center line in the design of the jet 20 is defined as the jet axis 19, and the diameter of the spout 17 is defined as the nozzle diameter d1. Here, with respect to the flat spray nozzle and the conical nozzle, the diameter of the spout 17 of the direct injection nozzle that injects the same flow rate as that of the nozzle is defined as a nozzle diameter d1. For example, a nozzle diameter d1 is 0.3 to 4.0 mm.

The moving mechanism 15 may comprise a turret 151. The turret 151 supports a plurality of nozzles 13. The turret 151 supplies the liquid 14 to one of the plurality of nozzles 13.

The piston load meter 21 includes a body 29, a pressure receiving plate 23, a stem 24, and a load meter 33. The piston load meter 21 may have a discharge hole 39 and a labyrinth 38.

The body 29 has a roof 29a, a measurement chamber 29c, a cylinder 29b and a side wall 29d.

The roof 29a is connected continuously to the side wall 29d. The upper surface of the roof 29a is preferably inclined with respect to a center axis 24a of the stem 24. The roof 29a inclines away from the pressure receiving plate 23 as it moves away from the center axis 24a. Preferably, the roof 29a is conical or pyramidal shape. Due to the inclination of the roof 29a, the jet 20 impinging on the roof 29a does not easily enter the measurement chamber 29c from the gap between the stem 24 and the cylinder 29b. The angle formed by the roof 29a and the jet axis 19 is, for example, 85 to 70 degrees. The roof 29a receives the jet 20 that has collided with the body 29, and repels the jet 20.

The measurement chamber 29c is provided at the center of the body 29. The measurement chamber 29c has a cylindrical shape or a rectangular parallelepiped shape.

Cylinder 29b is a cylindrical hole that extends from the center or top of roof 29a into measurement chamber 29c. The cylinder 29b extends along the center axis 24a. Preferably, the inner surface of the cylinder 29b is smoothly finished. The labyrinth 38 is provided in the cylinder 29b.

The side wall 29d has a columnar or prismatic shape. The body 29 preferably has a bottom surface. The side wall 29d protects the load meter 33 from the jet 20 and the mist.

The pressure receiving plate 23 has a plate shape or a columnar shape. The pressure receiving plate 23 has a pressure receiving surface 23a. The pressure receiving plate 23 may have an inclined surface 23b and a skirt 23c. The pressure receiving plate 23 receives the jet 20 and transmits a compressive load (hereinafter, simply referred to as "load F") received when the jet 20 collides with the pressure receiving surface 23a to the stem 24.

The outer diameter d3 of the pressure receiving plate 23 (the diameter of the inscribed circle of the cross section of the pressure receiving plate 23 for polygonal prism shaped pressure receiving plate 23) is equal to or larger than the diameter d4 of the stem 24.

The outer diameter d3 is desirably larger than the diameter d4. At this time, the pressure receiving plate 23 can repel the jet 20 and suppress the jet 20 from coming into contact with the stem 24. The jet 20 does not directly hit the gap between the stem 24 and the cylinder 29b, and the jet 20 bounced by the pressure receiving plate 23 proceeds in a direction different from the gap between the stem 24 and the cylinder 29b. Thus, the penetration of the liquid 14 into the measurement chamber 29c is suppressed.

The pressure receiving surface 23a is orthogonal to the center axis 24a. The inclined surface 23b is inclined with respect to the center axis 24a. The pressure receiving surface 23a is circular or polygonal shape. Hereafter, the diameter of the pressure receiving surface 23a or the diameter of the inscribed circle of the pressure receiving surface 23a is referred to as a pressure receiving diameter d2.

For example, the pressure receiving diameter d2 is two to three times the nozzle diameter d1. When the pressure receiving surface 23a is narrow with respect to the spread of the jet 20, the distribution of the load F is bell-shaped. The same is true when the nozzle 13 generates a jet 20 having a full cone shape.

The pressure receiving diameter d2 may be three to eight times the nozzle diameter d1. When the pressure receiving surface 23a is wide with respect to the spread of the jet 20, the distribution of the load F becomes frustoconical.

The angle formed by the inclined surface 23b and the center axis 24a is preferably 10 to 20 degrees. When the jet 20 collides with the inclined surface 23b, the jet 20 is directed away from the center axis 24a. The inclined surface 23b can suppress the entry of the jet 20 into the measurement chamber 29c from the gap between the cylinder 29b and the stem 24. Further, since the inclination of the inclined surface 23b is large, the component force along the center axis 24a of the collision force of the jet 20 colliding with the inclined surface 23b becomes small. Therefore, the collision force of the jet 20 colliding with the inclined surface 23b is hardly transmitted to the load meter 33.

The skirt 23c is provided on a surface opposite to the pressure receiving surface 23a. The skirt 23c is an inclined surface that is away from the center axis 24a as it is away from the pressure receiving surface 23a. When the pressure receiving surface 23a is disposed upward in the gravitational direction, the liquid 14 adhered to the skirt 23c flows down in a direction away from the stem 24. The skirt 23c can suppress the entry of the jet 20 into the measurement chamber 29c from the gap between the cylinder 29b and the stem 24.

When the pressure-receiving diameter d2 is φ3 or less, the pressure receiving plate 23 may have the same diameter as the stem 24, and the skirt 23c may be omitted.

The stem 24 extends along the center axis 24a. The stem 24 is cylindrical. Preferably, the surface of stem 24 is smoothly finished. The stem 24 reciprocates within the cylinder 29b. The stem 24 slides with the cylinder 29b. A stopper 31 is provided at the end of the stem 24 opposite the pressure receiving plate 23. The stopper 31 prevents the stem 24 from coming off the body 29. The stopper 31 is, for example, a retaining ring.

The load meter 33 is provided inside the measurement chamber 29c. The load meter 33 is, for example, a load cell or a piezoelectric sensor. The load meter 33 is of a compression type. The stem 24 and the load receiving seat 33a of the load meter 33 are brought into contact with each other, and the load direction and the center axis 24a are made to coincide with each other. For example, the strain-generating body of the load meter 33 is provided so as to be strained by pushing of the stem 24. The load meter 33 sends the load F to the control device 41. The load meter 33 may include an A/D converter. The load meter 33 may wirelessly communicate the load F with the control device 41.

The labyrinth 38 is provided in the cylinder 29b. The labyrinth 38 seals a gap between the stem 24 and the cylinder 29b.

The discharge hole 39 is a through hole for connecting the measurement chamber 29c and the outside of the body 29. The liquid 14 and the mist that have entered into the measurement chamber 29c are discharged from the discharge hole 39. The signal line of the load meter 33 may be provided through the discharge hole 39.

The compressed air supply device 35 delivers the dried compressed air 36 to the measurement chamber 29c through the supply channel 37. A portion of the compressed air 36 passes through the labyrinth 38 and leaks out of the gap between the stem 24 and the cylinder 29b to form an air curtain. The remainder of the compressed air 36 is discharged from the discharge hole 39. The compressed air supply device 35 can suppress the penetration of the liquid 14 into the measurement chamber 29c. When the liquid 14 enters into the measurement chamber 29c, the entered liquid 14 is efficiently discharged from the discharge hole 39.

The moving mechanism 15 moves the nozzle 13 relative to the piston load meter 21. The moving mechanism 15 supports the nozzle 13. The moving mechanism 15 is, for example, a vertical articulated robot, a scalar robot, an orthogonal axis robot, a parallel link robot, or a moving column and a carriage. The moving mechanism 15 is numerically controlled by the control device 41. The moving mechanism 15 freely moves the nozzle 13 on the XYZ orthogonal coordinates with respect to a center 59 of the pressure receiving surface 23a. Hereafter, for convenience, the X-axis and the Y-axis are defined on a flat surface passing through the pressure receiving surface 23a and perpendicular to the center axis 24a, and Z-axis is defined in a direction along the center axis 24a and away from the pressure receiving surface 23a.

The axial names may be interchanged.

Figure 2:
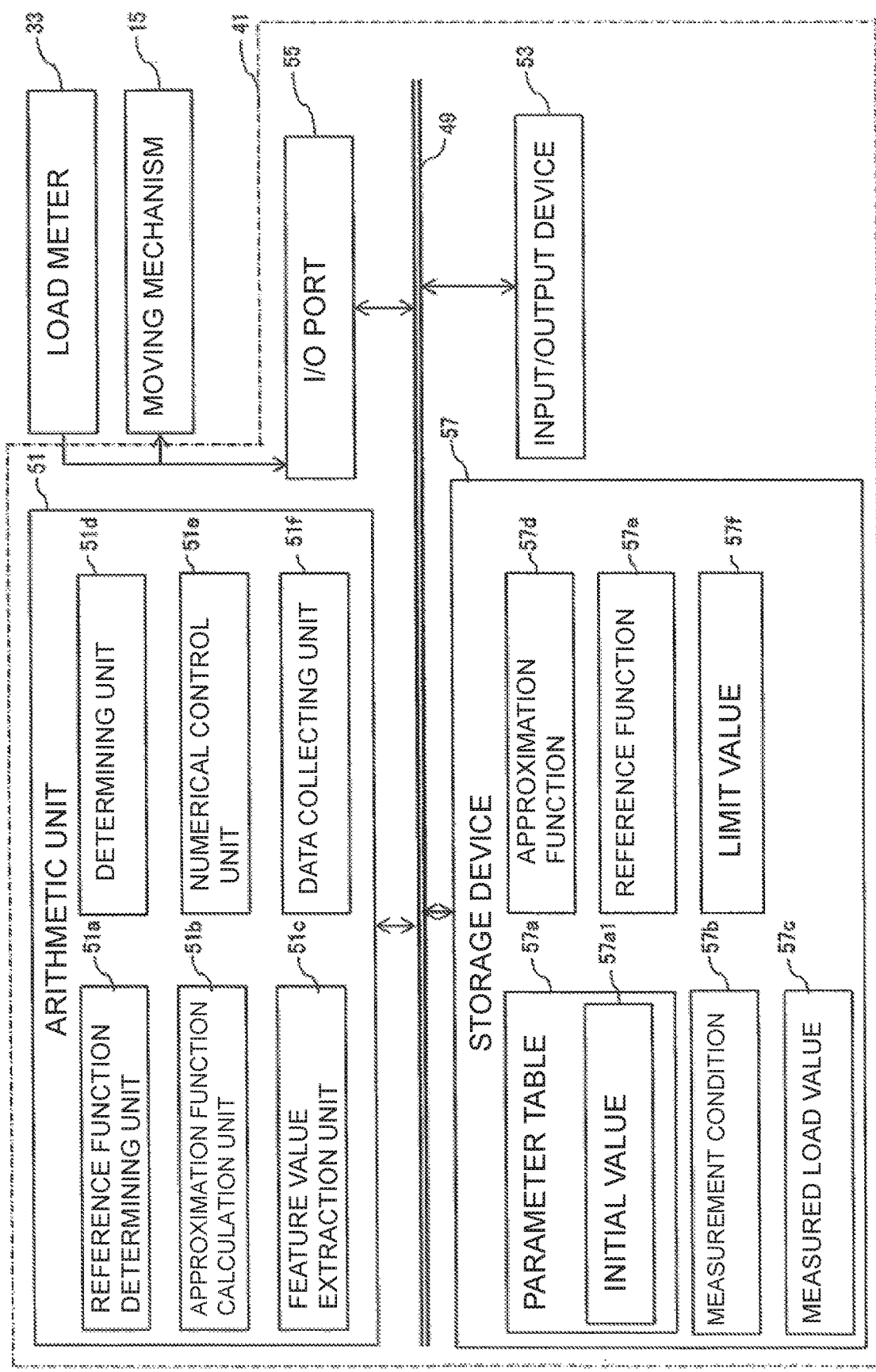
FIG. 2 shows a control device according to the embodiment.

The control device 41 will be described with reference to FIG. 2. The control device 41 includes a storage device 57, an arithmetic unit 51, an input/output device 53, an I/O port 55, and a bus 49. The storage device 57, the arithmetic unit 51, the input/output device 53, and the I/O port 55 are connected by a bus 49. The control device 41 is, for example, a numerical controller, a sequencer, or a personal computer.

The storage device 57 stores a reference function 57e, a measured load value 57c, and an approximation function 57d. The storage device 57 may store the measurement condition 57b, the parameter table 57a, and the limit value 57f of the feature value.

The reference function 57e is a function for obtaining an approximation function 57d with respect to the measured load value 57c. The reference function 57e is a function indicating a bell-shaped or frusto-conical curved surface including the X coordinate and the Y coordinate as variables. The reference function 57e is set according to the type of the nozzle, the piston load meter 21, and the injection conditions so as to match the distribution of the obtained load F. The reference function 57e may be a Gaussian function. The reference function 57e may be input via the input/output device 53 or the I/O port.

A plurality of reference functions 57e may be provided. When a plurality of reference functions 57e are provided, the reference functions 57e are selected according to the measurement conditions.

The parameter table 57a gives an initial value 57a1 of the coefficient of the reference function 57e corresponding to the measurement condition 57b. The parameter table 57a may include a limit value 57f.

Figure 3:
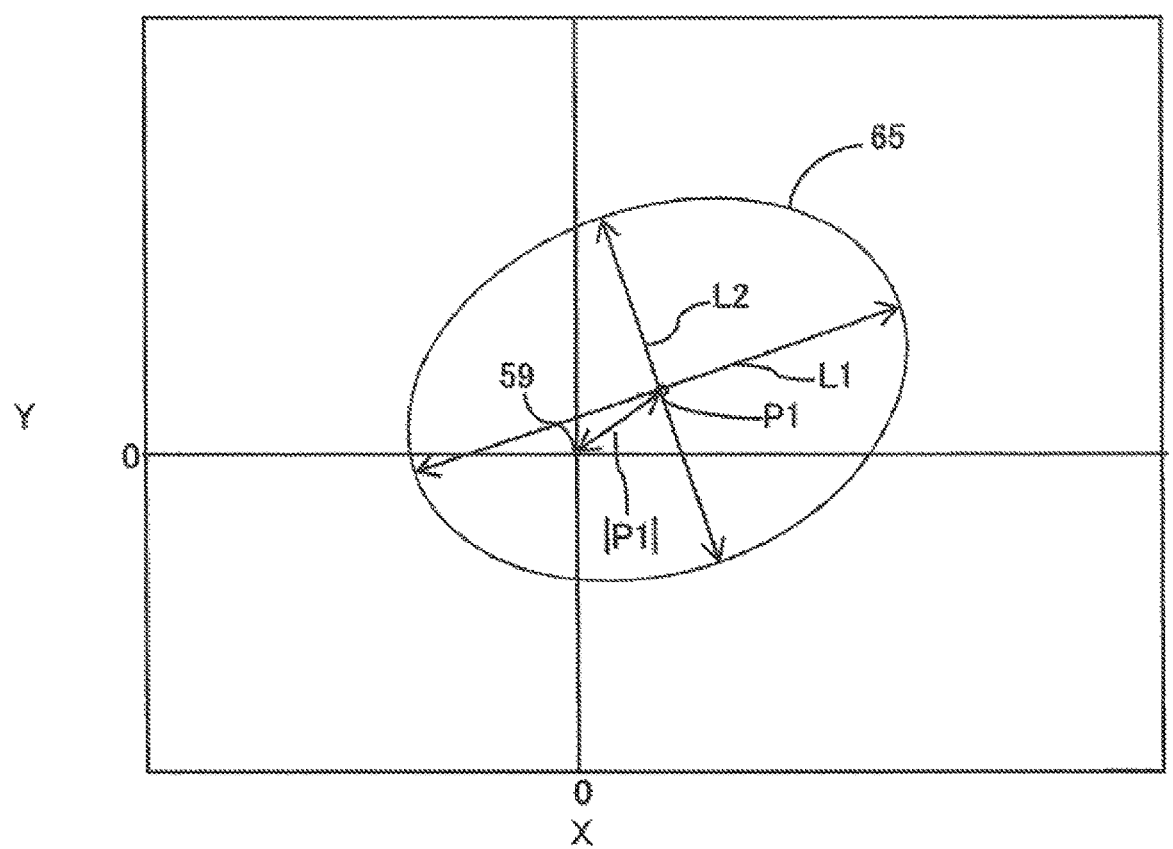
FIG. 3 shows feature values according to the embodiment.

Referring to FIG. 3, the feature value is a value indicating the characteristic of the jet 20, which is extracted from the approximation function 57d. The feature value is, for example, the peak height H, the displacement amount |P|, the displacement amount |P1|, the effective area A1 which is the area of the effective range 65, or the ratio of the long side to the short side of the effective range 65 (hereinafter, simply referred to as the "ratio I"). The load F for effective cleaning and deburring is defined as an effective load F1. The effective range 65 is a region in which the value of the approximation function 57d indicates the effective load F1 or more. The displacement amount |P| is a distance from the origin to the peak position P of the approximation function 57d. The peak height H is the peak height of the approximation function 57d. The displacement amount |P1| is a distance from the origin to the center of gravity P1 of the effective range 65. Since the feature values are extracted from the approximation function 57d, it is possible to obtain the estimated values from the overall measurement points including the variations of the individual measurement points.

The limit value 57f is provided corresponding to the measurement condition 57b. The limit value 57f is, for example, the minimum peak height Hmin, the maximum displacement amount |P|max, the maximum displacement amount |P1|max, the maximum effective area A1max, or the maximum ratio Imax. The minimum peak height Hmin is the minimum value of the peak height H, the maximum displacement |P|max is the maximum value of the displacement |P|, the maximum displacement |P1|max is the maximum value of the displacement |P1|, the maximum effective area A1max is the maximum value of the effective area A, and the maximum ratio Imax is the maximum value of the ratio I. The limit value 57f is experimentally determined, for example, as a range in which the cleaning ability is exhibited.

The measured load value 57c includes the load F and the XY coordinate value of the nozzle 13 with respect to the elapsed time from the measurement start time (hereinafter, simply referred to as time t).

The measurement condition 57b is an injection condition when the load F is measured. For example, the measurement condition 57b includes a nozzle type, a pressure, and a standoff distance L (hereinafter referred to as "distance L"). When the measurement condition 57b is determined by the numerical control program for each nozzle 13, the program number or the nozzle number may be set as the measurement condition 54b.

The arithmetic unit 51 includes an approximation function calculation unit 51b, a feature value extraction unit 51c, a numerical control unit 51e, and a data collecting unit 51f. The arithmetic unit 51 may include a reference function determining unit 51a and a determining unit 51d.

The reference function determining unit 51a determines the reference function 57e based on the measurement condition 57b and the parameter table 57a.

The approximation function calculation unit 51b calculates an approximation function 57d for approximating the measured load value 57c with respect to the reference function 57e. The approximation function calculation unit 51b can approximate the reference function 57e to the measured load value 57c by the least squares method. The approximation function calculation unit 51b uses, for example, the Levenberg-Marquardt method or the Gauss-Newton method. The approximation function calculation unit 51b reads the parameter table 57a and determines an initial value 57a1 of the reference function 57e.

The feature value extraction unit 51c extracts a feature value from the approximation function 57d. The feature value extraction unit 51c may calculate the feature value from the constant of the approximation function 57d. Further, the feature value extraction unit 51c may calculate the value of the approximation function 57d with respect to the coordinates (X, Y) given in the form of a matrix, and extract the feature value based on the obtained value.

The determining unit 51d compares the extracted feature value with the limit value 57f. When the feature value exceeds the limit value 57f, the determining unit 51d determines that the nozzle 13 is not suitable. When a plurality of feature values are provided and at least one feature value exceeds the limit value 57f, the determining unit 51d determines that the nozzle 13 is not suitable.

The numerical control unit 51e numerically controls the moving mechanism 15. The numerical control unit 51e controls the moving mechanism 15 and the pump 11 via the I/O port.

The data collecting unit 51f collects the load F from the load meter 33 and the XY coordinates of the nozzle 13 from the numerical control unit 51e at the same time at a constant cycle. The data collecting unit 51f stores the load F and the XY coordinates with respect to the time t in the storage device 57 as the measured load value 57c.

The data collecting unit 51f may be incorporated in the control device 41 as software. The data collecting unit 51f can use a data logger. The data logger may be incorporated into the host controller as an embedded board. The data logger may be separate and connected via an I/O port.

The inspection apparatus 10 may include a length measuring device such as a laser length measuring device. At this time, the data collecting unit 51f can collect the XY coordinates of the nozzle 13 from the length measuring device.

The I/O port 55 communicate data with the moving mechanism 15, the load meter 33, and the pump 11.

The input/output device 53 is, for example, a keyboard, a pointing device, or a monitor. The keyboard may be a software keyboard. The pointing device is, for example, a mouse or a touch panel.

Figure 4:
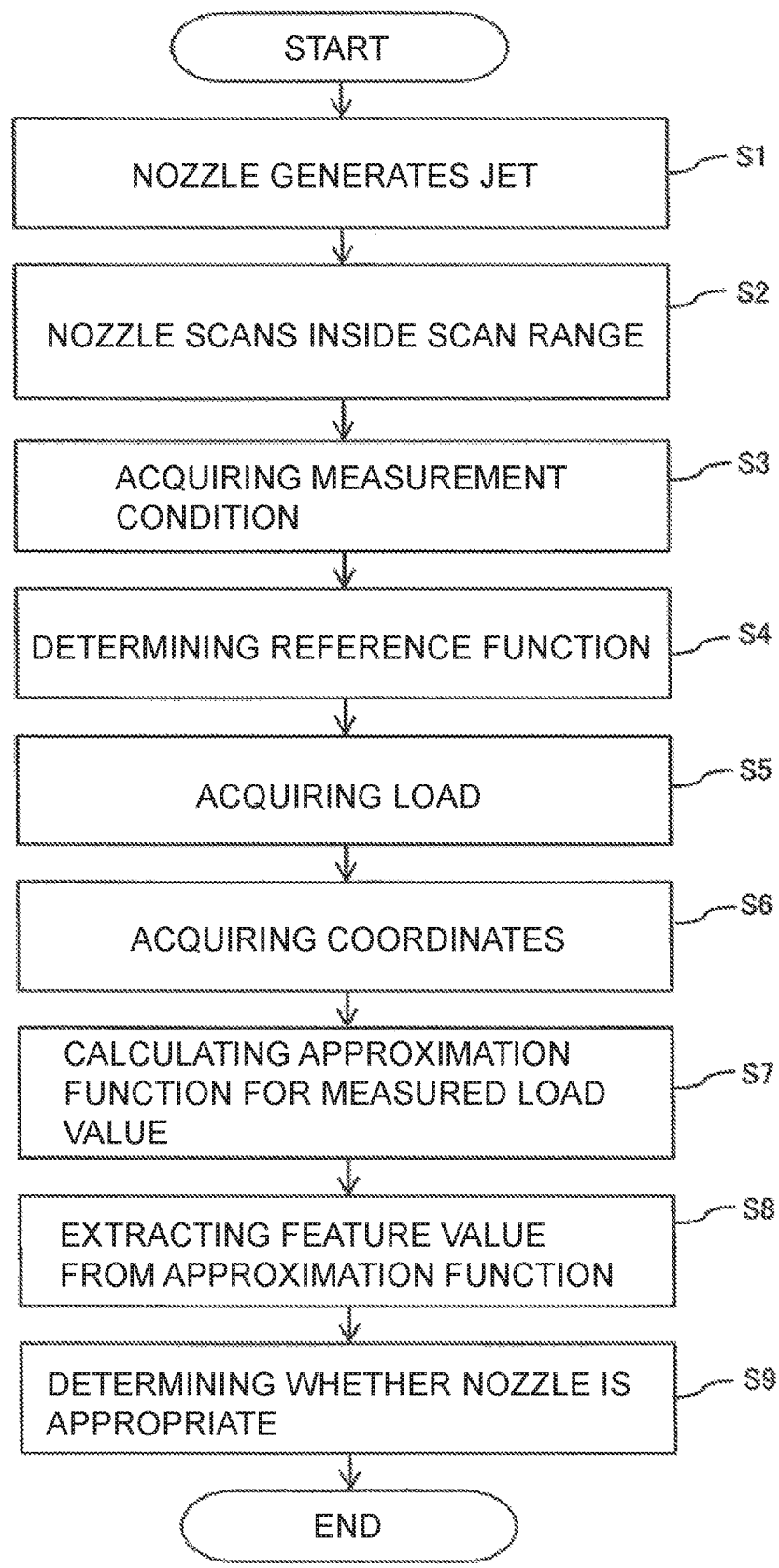
FIG. 4 shows a flowchart of a nozzle inspection method according to the embodiment.

Referring to FIG. 4, the procedure of the nozzle inspection method will be described. First, in step S1, the nozzle 13 generates the jet 20 (S1). Next, in step S2, the nozzle 13 scans the inside of the scan range 61. In step S3, the reference function determining unit 51a acquires the measurement condition 57b from the numerical control unit 51e or the pump 11. In step S4, the reference function determining unit 51a determines the reference function 57e based on the measurement condition 57b. In step S5, the load meter 33 acquires the load F. In step S6, the numerical control unit 51e acquires the coordinates X and Y of the nozzle 13. In step S7, the approximation function calculation unit 51b calculates an approximation function 57d for approximating the measured load value 57c. In step S8, the feature value extraction unit 51c extracts a feature value from the approximation function 57d. Finally, in step S9, the determining unit 51d determines whether or not the nozzle 13 is appropriate.

Steps S3, S4 and S9 may be omitted. The order of steps S1 to S3 may be interchanged.

Hereafter, each step will be described in detail. In step S1, the pump 11 pressurizes the liquid 14 and opens the valve 12. The liquid 14 sent to the nozzle 13 is ejected from the spout 17. The nozzle 13 starts jetting outside the scan range 61.

Figure 5:
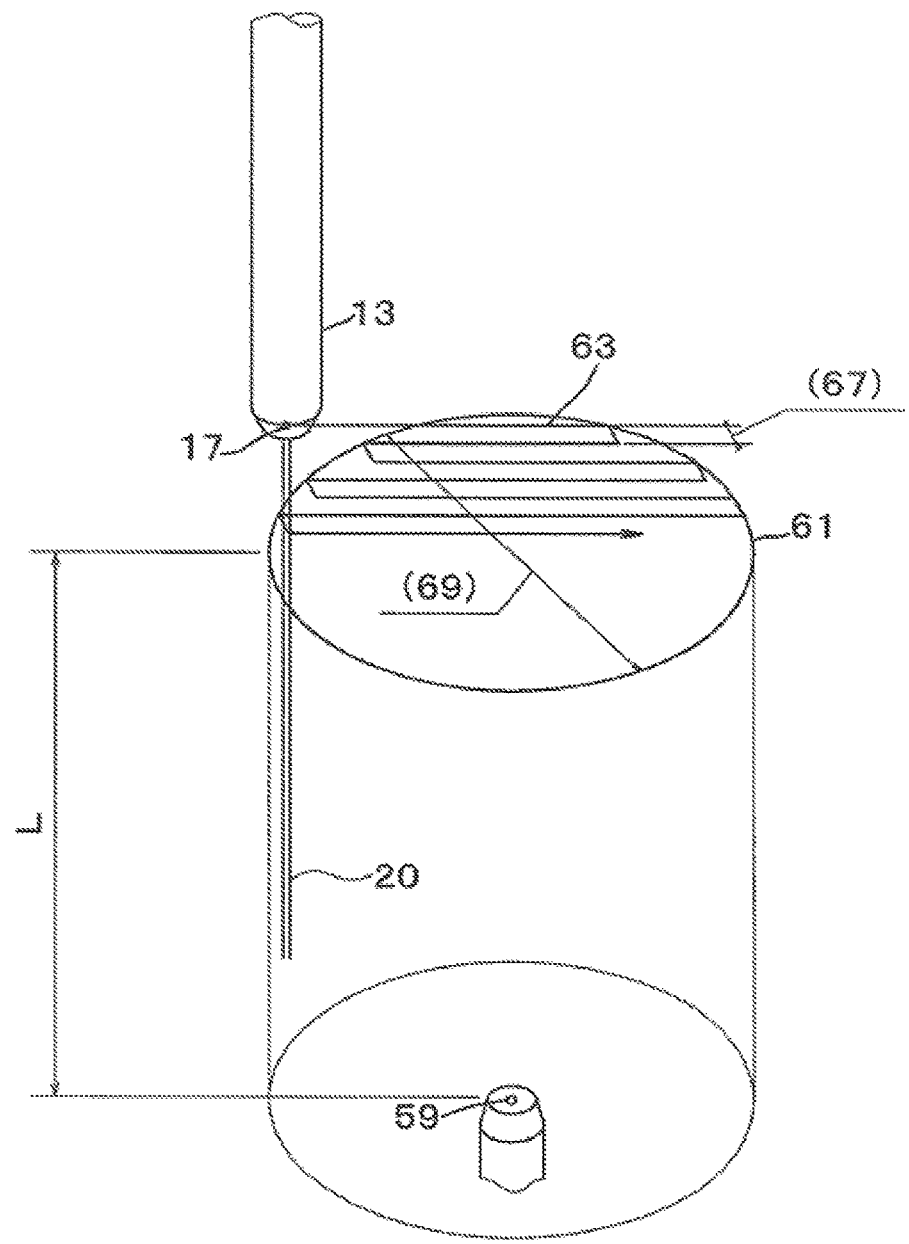
FIG. 5 shows a scanning method of the nozzle according to the embodiment.

As shown in FIG. 5, in step S2, the nozzle 13 scans within the scan range 61 along the programmed locus 63. Preferably, the nozzle 13 moves at a constant speed. Preferably, the locus 63 is set at a uniform density throughout the scan range 61. The scanning density of the locus 63 may be sparse in the peripheral portion of the scan range 61 than in the central portion. When the nozzle 13 scans within the scan range 61, the jet 20 collides with the pressure receiving surface 23a. The nozzle 13 moves outside the scan range 61 after scanning within the scan range 61.

The scan range 61 may be rectangular, regular polygonal or circular. The center 59 of the scan range 61 is set on the center axis 24a. The scan range 61 has an area in which the peak of the load F can be observed with respect to the allowable displacement amount |P| and the displacement amount |P1|. If the scan range 61 is a circle, its diameter is defined as a characteristic length 69, and if the scan range 61 is a polygonal, the diameter of the inscribed circle is defined as the characteristic length 69. The characteristic length 69 is larger than the outer diameter d3 of the pressure receiving plate 23. For example, in a direct injection nozzle, the characteristic length 69 can be 10 to 20 times the nozzle diameter d1.

The locus 63 is set in a flat surface separated from the pressure receiving surface 23a by a distance L. The distance L is determined in accordance with the operation of the jet apparatus to which the inspection apparatus 10 is applied. For example, in cleaning and deburring, L is set to 20 to 200 mm.

The locus 63 is set so that the nozzles uniformly pass through the scan range 61 at a predetermined scanning interval (hereinafter simply referred to as an interval 67). By way of example, the locus 63 of FIG. 5 traverses the end of the scan range 61 in the X positive direction, travels the interval 67 in the Y negative direction, then traverses the scan range 61 in the X negative direction, again travels the interval 67 in the Y negative direction, and traverses the scan range 61 in the X positive direction. The locus 63 repeatedly reciprocates over the entire surface of the scan range 61 at regular intervals 67.

When the inspection apparatus 10 is applied to a washing machine, as an example, the characteristic length 69 can be set to 5 to 10 mm for a distance L=100 mm. The interval 67 is preferably between 0.3 and 1.5 times the nozzle diameter d1. The moving speed of the nozzle 13 is 100 to 500 mm/min.

In step S3, the reference function determining unit 51a acquires the program number, the nozzle number, the pressure, or the distance L from the numerical control unit 51e. The reference function determining unit 51a may acquire the pressure from the pump 11. The reference function determining unit 51a stores the acquired measurement condition 57b in the storage device 57.

In step S4, the reference function determining unit 51a reads the measurement condition 57b from the storage device 57, and determines the reference function 57e.

In step S5, the jet 20 collides with the pressure receiving surface 23a. The pressure receiving surface 23a receives a collision force in a direction in which the pressure receiving surface 23a is pushed down by the jet 20. The stem 24 transmits the force received by the pressure receiving surface 23a to the load meter 33. The load meter 33 detects the load F received from the stem 24.

The data collecting unit 51f sequentially acquires the load F at the time t from the load meter 33. The measurement cycle is, for example, 200 to 1000 times per second. The load meter 33 records the measured load F together with the time t after the start of the measurement in the storage device 57.

In step S6, the data collecting unit 51f sequentially acquires the XY coordinates at time t from the numerical control unit 51e. Step S6 is performed simultaneously with step S5. The data collecting unit 51f may round the two or three digits after the decimal point of the obtained XY coordinates to align the numbers.

In step S7, the approximation function calculation unit 51b reads the reference function 57e and the measured load value 57c from the storage device 57. Preferably, the approximation function calculation unit 51b further reads the measurement condition 57b and the parameter table 57a from the storage device 57. The approximation function calculation unit 51b calculates an approximation function 57d for approximating the measured load value 57c based on the reference function 57e and the measured load value 57c. The approximation function calculation unit 51b may determine the initial value 57a1 based on the measurement condition 57b and the parameter table 57a. The approximation function calculation unit 51b stores the calculated approximation function 57d in the storage device 57.

In step S8, the feature value extraction unit 51c reads the approximation function 57d from the storage device 57. The feature value extraction unit 51c calculates a feature value from the approximation function 57d and stores the feature value in the storage device 57. The feature value extraction unit 51c outputs a graph indicating the value of the approximation function 57d with respect to the feature value or the coordinate value (x, y) to the input/output device 53.

In step S8, the determining unit 51d reads out the feature value from the storage device 57. The determining unit 51d compares the feature value with the limit value 57f to judge whether the nozzle 13 is appropriate or not. The determining unit 51d outputs the suitability of the nozzle 13 to the input/output device 53.

Example 1

Non-limiting examples are provided below.

For example, the straight jet nozzle (nozzle diameter d1=φ1.2 mm), the pressure receiving diameter d2=φ3 mm, the distance L=100 mm, the characteristic length (69)=φ10 mm, the pressure 10 MPa, and the interval (67)=0.5 mm. In this condition, a typical bell-shaped peak is observed.

The reference function 57e is given by Equation 1. The function f(x,y) is a bell-shaped function.

$$F=f(x,y)=A \exp[B(x^2+Cxy+Dy^2+Ex+Fy+G)]$$ [Equation 1]

Where A, B, C, D, E, F, and G are constants.

The parameter table 57a shows the initial values 57a1 of the constants A to G when the nozzle type, the pressure, and the distance L are set, respectively. The parameter table 57a includes a limit value 57f. The limit value 57f includes a maximum displacement amount |P|max and a minimum peak height Hmin.

The feature value extraction unit 51c can extract the feature value by the following method. Coordinates satisfying f(x,y)=F1 are given as below.

$$x^2 + Cxy + Dy^2 + Ex + Fy + G = \frac{1}{B}\ln\frac{F1}{A}$$ [Equation 2]

Equation 2 is an elliptic function.

The center coordinate P of the ellipse in Equation 2 is given as below.

$$P(X1, Y1) = \left(\frac{CF - 2DE}{4D - C^2}, \frac{CE - 2F}{4D - C^2}\right)$$ [Equation 3]

The feature value extraction unit 51c substitutes the center coordinate P into f(x, y), and calculates the peak height H=f(x, y).

The displacement amount |P| is given by the distance from the origin (0, 0) to the center coordinate (X1, Y1).

Example 2

For example, it is assumed that the straight jet nozzle (nozzle diameter d1=φ1.2 mm), a pressure receiving diameter d2=φ10 mm, a distance L=100 mm, a characteristic length (69)=φ12 mm, a pressure of 2 MPa, and a interval (67)=0.5 mm. In this condition, a typical frusto-conical peak is observed.

The reference function 57e is given by Equation 4. Equation 4 can be approximated to a frusto-conical function.

$$F=g(x,y)=A \exp[E(x^2+Cxy+Dy^2+Ex+Fy+G)] - H \exp[I(x^2 Jxy+Ky^2+Lx+My+N)]$$ [Equation 4]

Where A, B, C, D, E, F, G, H, I, J, K, L, M, and N are constants.

The parameter table 57a shows the initial values 57a1 of the constants A to N when the nozzle type, the pressure, and the distance L are set, respectively.

The feature value extraction unit 51c calculates the value f(x, y) of the approximation function 57d with respect to the coordinates (x, y) given in the form of a matrix. Here, the coordinates (x, y) are given at equal intervals. For example, the interval between the coordinates (X, Y) can be set to 1/10 to 1/20 of the characteristic length 69. The feature value extraction unit 51c determines the effective range 65 from the distribution of the values f(x, y). The feature value extraction unit 51c calculates the center of gravity P1, the long side L1, the short side L2, or the area A2. The feature value extraction unit 51c calculates a displacement amount |P1| from the center of gravity P1. The feature value extraction unit 51c calculates the ratio I=L1/L2 using the long side L1 and the short side L2. The feature value extraction unit 51c calculates the maximum load Fmax from the maximum value of f(x, y).

In the embodiments and examples described above, the reference function 57e is a function of a curved surface in which both the X coordinate and the Y coordinate are variables. Alternatively, the reference function 57e may store in advance a function having one of the X coordinate and the Y coordinate as a variable. For example, the reference function 57e may be a Gaussian function, a Lorens function, or a logistic function. At this time, the approximation function 57d is calculated for each of the X direction and the Y direction. For example, in the case of scanning as shown in FIG. 5, the load F is approximated to the reference function 57e for each Y coordinate. The average of the peak positions of the obtained approximation functions is denoted by Y1. The load F within the range from Y1 to the constant width ΔY is read from the measured load value 57c. The load F is approximated to the X coordinate. The peak position of the approximation function in the X direction is defined as X1. The coordinates (X1, Y1) are calculated as the peak position P.

REFERENCE SIGNS LIST

10 Inspection apparatus
11 Pump
12 Valve
13 Nozzle
15 Moving mechanism
17 Spout
21 Piston load meter
23 Pressure receiving plate
24 Stem
24a center axis
29 Body
31 Stopper
33 Load meter
35 Compressed air supply device
37 Supply channel
38 Labyrinth
39 Discharge hole
41 Control device
49 Bus
51 Arithmetic unit
57 Storage device
61 Scan range
63 Locus
65 Effective range
F Load
F1 Effective load
P Peak position
A1 Effective area
P1 Center of gravity

What is claimed is:

1. A nozzle inspection apparatus, comprising:
a pump;
a nozzle having a spout, the nozzle connected to the pump;
a piston load meter including,
a body having a cylinder,
a pressure receiving plate configured to receive a jet generated by the nozzle,
a stem fixed to the pressure receiving plate, the stem configured to reciprocate within the cylinder, and
a load meter configured to measure a load applied to the pressure receiving plate, the load meter being in contact with a distal end of the stem; and
a moving mechanism configured to move the nozzle relative to the pressure receiving plate.

2. The nozzle inspection apparatus according to claim 1, wherein
the pressure receiving plate is circular shape, and
a diameter of the pressure receiving plate is larger than a diameter of the stem.

3. The nozzle inspection apparatus according to claim 1, wherein
the pressure receiving plate is polygonal shape, and
a diameter of an inscribed circle of the polygonal pressure receiving plate is larger than a diameter of the stem.

4. The nozzle inspection apparatus according to claim 1, wherein the pressure receiving plate includes,
a pressure receiving surface that is orthogonal to the stem,
an inclined surface arranged on side of the pressure receiving plate, the inclined surface being inclined with respect to the stem, and
a skirt arranged on a surface opposite to the pressure receiving surface, the skirt being inclined and away from the stem as the skirt is away from the pressure receiving surface.

5. The nozzle inspection apparatus according to claim 1, further comprising:
a control device, including
a storage device configured to store a measured load value including the load measured by the load meter and a coordinate value of the nozzle, the storage device configured to store a reference function, and
an arithmetic unit including
an approximation function calculation unit configured to calculate an approximation function for the reference function with respect to the measured load value, and
an extraction unit configured to extract a feature value from the approximation function, the feature value indicating a characteristic of the jet.

6. The nozzle inspection apparatus according to claim 5, wherein
the storage device is configured to store a parameter table that gives an initial value of a coefficient of the reference function corresponding to a measurement condition, and
the approximation function calculation unit is configured to determine the initial value based on the measurement condition and the parameter table.

7. The nozzle inspection apparatus according to claim 5, wherein
the feature value includes a displacement amount that is either a distance from an origin to a peak position of the approximation function or a distance from the origin to a center of gravity of an effective range that is a region in which a value of the approximation function indicates an effective load or more.

8. The nozzle inspection apparatus according to claim 2, wherein the pressure receiving plate includes,
a pressure receiving surface that is orthogonal to the stem,
an inclined surface arranged on side of the pressure receiving plate, the inclined surface being inclined with respect to the stem, and
a skirt arranged on a surface opposite to the pressure receiving surface, the skirt being inclined and away from the stem as the skirt is away from the pressure receiving surface.

9. The nozzle inspection apparatus according to claim 3, wherein the pressure receiving plate includes,
a pressure receiving surface that is orthogonal to the stem,
an inclined surface arranged on side of the pressure receiving plate, the inclined surface being inclined with respect to the stem, and
a skirt arranged on a surface opposite to the pressure receiving surface, the skirt being inclined and away from the stem as the skirt is away from the pressure receiving surface.

10. The nozzle inspection apparatus according to claim 2, further comprising:
a control device, including
a storage device configured to store a measured load value including the load measured by the load meter and a coordinate value of the nozzle, the storage device configured to store a reference function, and
an arithmetic unit including
an approximation function calculation unit configured to calculate an approximation function for the reference function with respect to the measured load value, and
an extraction unit configured to extract a feature value from the approximation function, the feature value indicating a characteristic of the jet.

11. The nozzle inspection apparatus according to claim 3, further comprising:
a control device, including
a storage device configured to store a measured load value including the load measured by the load meter and a coordinate value of the nozzle, the storage device configured to store a reference function, and
an arithmetic unit including
an approximation function calculation unit configured to calculate an approximation function for the reference function with respect to the measured load value, and
an extraction unit configured to extract a feature value from the approximation function, the feature value indicating a characteristic of the jet.

12. The nozzle inspection apparatus according to claim 6, wherein
the feature value includes a displacement amount that is either a distance from an origin to a peak position of the approximation function or a distance from the origin to a center of gravity of an effective range that is a region in which a value of the approximation function indicates an effective load or more.

13. A nozzle inspection method, comprising:
scanning, by a nozzle, inside a scan range on a plane parallel to a pressure receiving surface of a piston load meter;
measuring, by the pressure receiving surface, a load value by a jet generated by the nozzle;

acquiring a coordinate of the nozzle with respect to a center of the pressure receiving surface;

calculating an approximation function for approximating the load value to a reference function with respect to a coordinate value of the nozzle; and extracting a feature value from the approximation function, the feature value indicating a characteristic of the jet.

14. The nozzle inspection method according to claim 13, further comprising:

acquiring an injection condition of the nozzle; and determining an initial value of a coefficient of the reference function based on the injection condition and the parameter table.

15. The nozzle inspection method according to claim 13, wherein the feature value includes a displacement amount that is a distance from a center of the pressure receiving surface to a peak position of the approximation function, and the method further comprising:

calculating a peak position of the approximation function; and calculating the displacement amount.

16. The nozzle inspection method according to claim 13, wherein the feature value includes a displacement amount that is a distance from a center of the pressure receiving surface to a center of gravity of an effective range that is a region in which a value of the approximation function indicates an effective load or more, the method further comprising:

calculating a value of the approximation function with respect to coordinates given in the form of a matrix;

calculating the effective range in which a value of the approximation function indicates the effective load or more.

17. The nozzle inspection method according to claim 13, further comprising:

comparing the feature value with a limit value of the feature value to determine whether the nozzle is suitable.

18. The nozzle inspection method according to claim 14, wherein the feature value includes a displacement amount that is a distance from a center of the pressure receiving surface to a peak position of the approximation function, and the method further comprising:

calculating a peak position of the approximation function; and calculating the displacement amount.

19. The nozzle inspection method according to claim 14, wherein the feature value includes a displacement amount that is a distance from a center of the pressure receiving surface to a center of gravity of an effective range that is a region in which a value of the approximation function indicates an effective load or more, the method further comprising:

calculating a value of the approximation function with respect to coordinates given in the form of a matrix;

calculating the effective range in which a value of the approximation function indicates the effective load or more.

20. The nozzle inspection method according to claim 14, further comprising:

comparing the feature value with a limit value of the feature value to determine whether the nozzle is suitable.

* * * * *